United States Patent
Enomoto et al.

(10) Patent No.: US 10,151,577 B2
(45) Date of Patent: Dec. 11, 2018

(54) ELEVATOR HOISTWAY DIMENSION MEASURING APPARATUS AND MEASURING METHOD THEREFOR

(71) Applicant: MITSUBISHI ELECTRIC CORPORATION, Chiyoda-ku (JP)

(72) Inventors: Yu Enomoto, Chiyoda-ku (JP); Hideki Nakamura, Chiyoda-ku (JP); Keisuke Sambongi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/315,977

(22) PCT Filed: Jan. 13, 2015

(86) PCT No.: PCT/JP2015/050678
§ 371 (c)(1),
(2) Date: Dec. 2, 2016

(87) PCT Pub. No.: WO2015/190121
PCT Pub. Date: Dec. 17, 2015

(65) Prior Publication Data
US 2017/0122723 A1    May 4, 2017

(30) Foreign Application Priority Data
Jun. 13, 2014    (JP) ................. 2014-122398

(51) Int. Cl.
*G01B 11/14*    (2006.01)
*G01B 11/00*    (2006.01)
(Continued)

(52) U.S. Cl.
CPC .............. *G01B 11/005* (2013.01); *B66B 7/00* (2013.01); *G01B 11/14* (2013.01); *B66B 19/007* (2013.01)

(58) Field of Classification Search
CPC ...... B66B 19/007; F16C 19/06; F16C 33/783; F16C 33/785; G01B 11/005; G01B 11/14; G01B 11/16
(Continued)

(56) References Cited

U.S. PATENT DOCUMENTS 5,137,354 A    8/1992    deVos et al.
5,983,166 A    11/1999    Matsumoto et al.
(Continued)

FOREIGN PATENT DOCUMENTS

ES    1-075480 U    10/2011
JP    59-41585 A    3/1984
(Continued)

OTHER PUBLICATIONS

Japanese Office Action dated Jun. 27, 2017 in Japanese Patent Application No. 2016-527656 (with English translation).
(Continued)

*Primary Examiner* — Sunghee Y Gray
(74) *Attorney, Agent, or Firm* — XSENSUS LLP (57) ABSTRACT

An elevator hoistway dimension measuring apparatus includes: a base that is mounted to a floor; a first arm that extends in a first direction from the base so as to penetrate inside a hoistway; a pair of second arms that extend from two sides of the base when viewed in the first direction, and that are respectively placed in contact with inner surfaces of a facing pair of jambs of a doorframe; a pair of third arms that extend parallel to the second arms beyond the jambs of the doorframe; and a three-dimensional coordinate measuring machine that is mounted to an end portion of the first arm to measure the hoistway three-dimensionally from inside the hoistway, whereby measuring time is shortened significantly, and safety is also improved.

13 Claims, 7 Drawing Sheets

(51) Int. Cl.
  *B66B 7/00* (2006.01)
  *B66B 19/00* (2006.01)
(58) Field of Classification Search
  USPC .................................................... 356/625
  See application file for complete search history.

(56) References Cited

U.S. PATENT DOCUMENTS

| | | |
|---|---|---|
| 2002/0148689 A1 | 10/2002 | Pettersson et al. |
| 2011/0134439 A1 | 6/2011 | Juvonen et al. |
| 2012/0305337 A1* | 12/2012 | Hopp .................... B66B 11/001 187/336 |
| 2013/0229512 A1 | 9/2013 | Steffey et al. |

FOREIGN PATENT DOCUMENTS

| | | |
|---|---|---|
| JP | 61-117365 A | 6/1986 |
| JP | 2-144393 A | 6/1990 |
| JP | 05-340085 A | 12/1993 |
| JP | 9-89560 A | 4/1997 |
| JP | 11-513963 A | 11/1999 |
| JP | 2002-81935 A | 3/2002 |
| JP | 2003-65719 A | 3/2003 |
| JP | 2003-155184 A | 5/2003 |
| JP | 2005-96919 A | 4/2005 |
| JP | 2005-98786 A | 4/2005 |
| JP | 2006-62796 A | 3/2006 |
| JP | 2007-261794 A | 10/2007 |
| JP | 2009-51574 A | 3/2009 |
| JP | 4411371 B1 | 2/2010 |
| KR | 10-2001-0048434 A | 6/2001 |
| WO | 2010/116032 A1 | 10/2010 |
| WO | 2014/027142 A1 | 2/2014 |
| WO | WO 2014/027142 A1 | 2/2014 |

OTHER PUBLICATIONS

International Search Report dated Apr. 21, 2015 in PCT/JP2015/050678 filed Jan. 13, 2015.
Korean Office Action dated Nov. 23, 2017 in Korean Patent Application No. 10-2017-7000618 (with English translation).
Extended European Search Report dated Mar. 2, 2018 in corresponding European Application No. 15806300.8.
Toyomi Fujita and Yuya Kondo; "3D Terrain Sensing System using Laser Range Finder with Arm-Type Movable Unit"; published by INTECH; http://www.intechopen.com/books/robot-arms.

* cited by examiner

ELEVATOR HOISTWAY DIMENSION MEASURING APPARATUS AND MEASURING METHOD THEREFOR

TECHNICAL FIELD

The present invention relates to an elevator hoistway dimension measuring apparatus that measures dimensions of an elevator hoistway, and a measuring method therefor.

BACKGROUND ART

In the renovation and refurbishment of elevators, when first investigating equipment that is to be upgraded or newly added, dimensions are required for existing equipment and structures, such as guide rails, cars, and the hoistway itself, for example. At present, measurement of these dimensions is implemented by workers actually going to the building site, and using tape measures and laser rangefinders, etc.

Manual measurements of this kind by workers generally require manpower of two or more people.

For example, measurement of a lower portion of the hoistway is implemented by raising an elevator car, which is obstruction, during measurement.

When measuring an upper portion of the hoistway, measurement is performed by climbing on top of the elevator car.

Because of that, two workers are required, i.e., one worker who operates the elevator car from inside the car, and another worker who climbs on top of the elevator car to perform the measurements.

For that reason, there is further demand to save manpower, and in addition, shortening of measurement time is also in demand because these operations require elevator shutdown.

Improvements in safety are also desired because work also occurs on top of the elevator car.

Because of that, methods have been proposed in which an elevator hoistway measuring apparatus is installed on a car inside a hoistway, for example, to perform measurements instead of manual measurement by workers (see Patent Literature 1, 2, and 3, for example).

CITATION LIST

Patent Literature

Patent Literature 1: Japanese Patent Laid-Open No. 2005-98786 (Gazette)
Patent Literature 2: Japanese Patent Laid-Open No. 2005-96919 (Gazette)
Patent Literature 3: Japanese Patent Laid-Open No. 2006-62796 (Gazette)

SUMMARY OF THE INVENTION

Problem to be Solved by the Invention

However, conventional elevator hoistway measuring apparatuses such as those described above are all installed on top of the car, and because elevator operation must be stopped and workers must enter the hoistway to perform installation on top of the car, some problems have been that the measuring time becomes longer, and that elevator operation must be stopped for a proportionately longer time.

Another problem has been safety during work on the top of the car.

In actual measurement, methods that use a three dimensional coordinate measuring machine that uses a laser beam are conceivable, but because a car is present in an existing hoistway, and unwanted data is also obtained during dimensional measurement of the hoistway, another problem has been that it is difficult to measure the dimensions of all regions of the hoistway smoothly.

The present invention aims to solve such problems and an object of the present invention is to provide an elevator hoistway dimension measuring apparatus in which measuring time is shortened significantly, and safety is also improved as a result of enabling hoistway dimensions to be measured without workers entering a hoistway to install a measuring machine on top of a car.

Another object of the present invention is to provide a measuring method for an elevator hoistway dimension measuring apparatus that can perform dimensional measurement of all regions of a hoistway smoothly using the above elevator hoistway dimension measuring apparatus.

Means for Solving the Problem

An elevator hoistway dimension measuring apparatus according to the present invention includes: a base that is mounted to a floor; a first arm that extends in a first direction from the base so as to penetrate inside a hoistway; a pair of second arms that extend from two sides of the base when viewed in the first direction, and that are respectively placed in contact with inner surfaces of a facing pair of jambs of a doorframe; a pair of third arms that extend parallel to the second arms beyond the jambs of the doorframe; and a three-dimensional coordinate measuring machine that is mounted to an end portion of the first arm to measure the hoistway three-dimensionally from inside the hoistway.

An elevator hoistway dimension measuring apparatus according to the present invention includes: an arm that is wider than a doorframe, two end portions of the arm being placed in contact with a facing pair of jambs of the doorframe; a penetrating member, a base end portion of which is disposed on the arm, and a leading end portion of which penetrates inside a hoistway; a three-dimensional coordinate measuring machine that is mounted to an end portion of the penetrating member to measure the hoistway three-dimensionally from inside the hoistway; and a pair of contacting members that are respectively disposed on two ends of the arm so as to come into contact with inner surfaces of the jambs.

A measuring method for a elevator hoistway dimension measuring apparatus according to the present invention uses the elevator hoistway dimension measuring apparatus according to any one of Claims 1 through 9 to measure dimensions of the hoistway, and the measuring method includes: removing a car that ascends and descends through the hoistway further upward or downward than an installation floor on which the elevator hoistway dimension measuring apparatus is installed; subsequently obtaining lower level floor data for floors that are lower than an upper level floor that is above the installation floor using the three-dimensional coordinate measuring machine when the car is at the upper level floor; obtaining upper level floor data for floors that are higher than a lower level floor that is below the installation floor using the three-dimensional coordinate measuring machine when the car is at the lower level floor; and subsequently integrating the lower level floor data and the upper level floor data based on data for shared portions of the hoistway in the lower level floor data and the upper level floor data to obtain dimensions of all regions of the hoistway from the integrated data.

Effects of the Invention

The elevator hoistway dimension measuring apparatus according to the present invention can be installed inside a hoistway without a worker entering the hoistway to install the measuring apparatus inside the hoistway, shortening measuring time significantly, and also improving safety.

According to the measuring method for the elevator hoistway dimension measuring apparatus according to the present invention, because lower level floor data and upper level floor data that do not contain data for a car, which is data that is not required for dimensional measurement of the hoistway, are obtained, and the lower level floor data and upper level floor data are integrated based on data for shared portions thereof, and dimensions of all regions of the hoistway can be obtained from that integrated data, more accurate dimensions of all regions of the hoistway can be obtained.

DESCRIPTION OF EMBODIMENTS

Respective embodiments of the present invention will now be explained based on the drawings, and identical or corresponding members and portions in each of the drawings will be given identical numbering.

Embodiment 1

Figure 1:
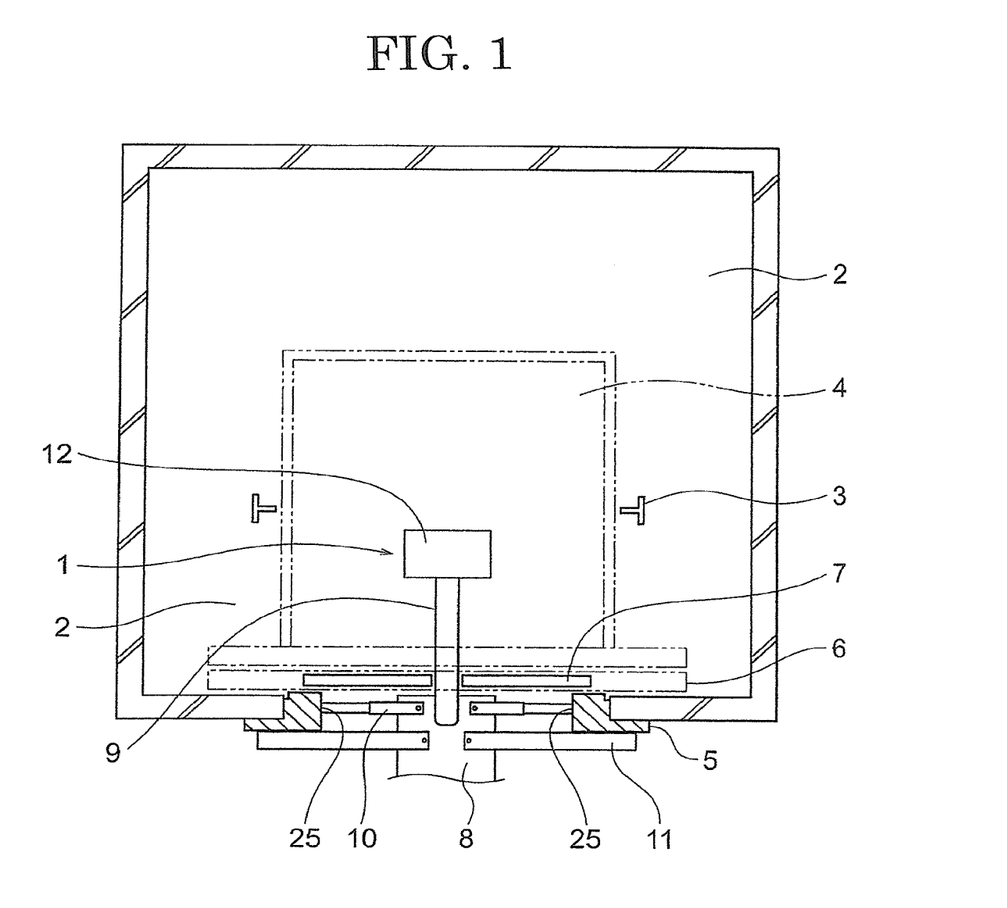
FIG. 1 is a cross section that shows a hoistway that is measured using an elevator hoistway dimension measuring apparatus according to Embodiment 1 of the present invention.
Figure 2:
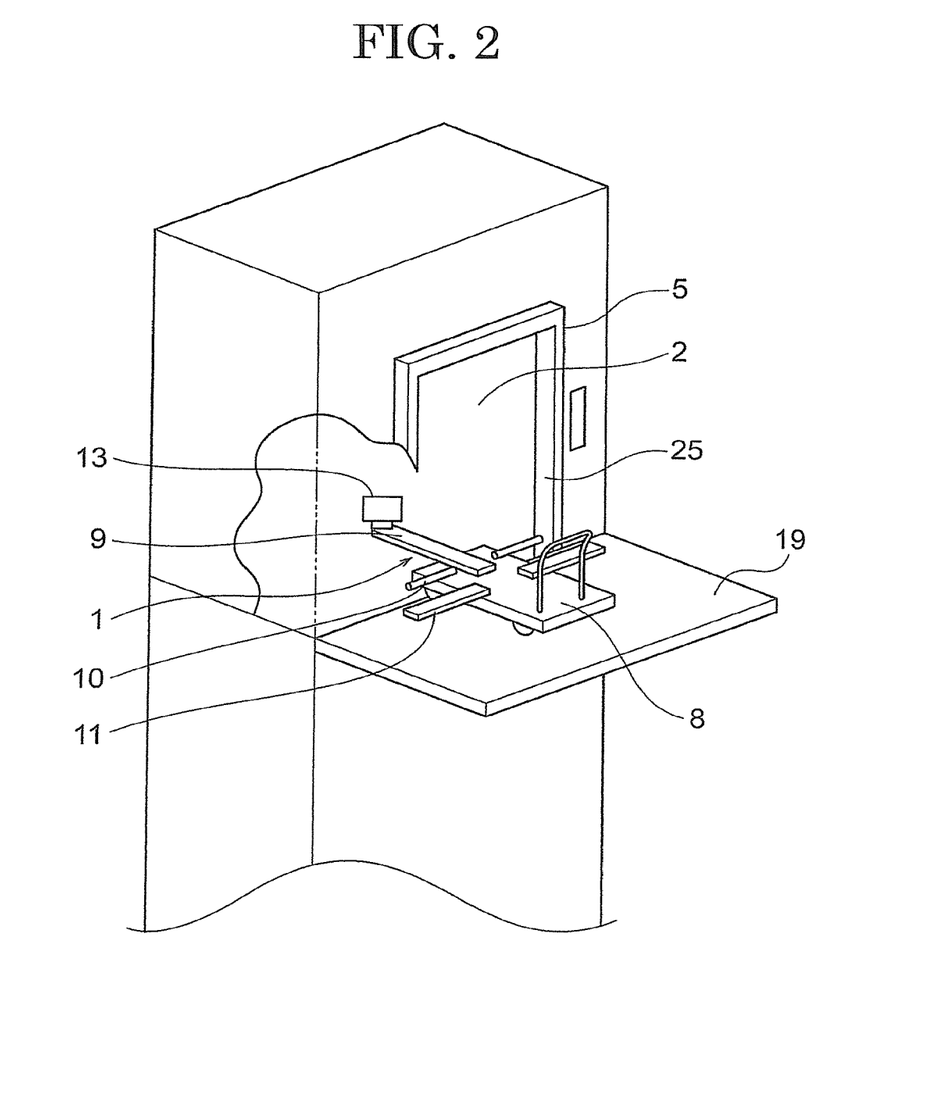
FIG. 2 is an oblique projection that shows a state in which dimensions of the hoistway are measured using the elevator hoistway dimension measuring apparatus in FIG. 1.
Figure 3:
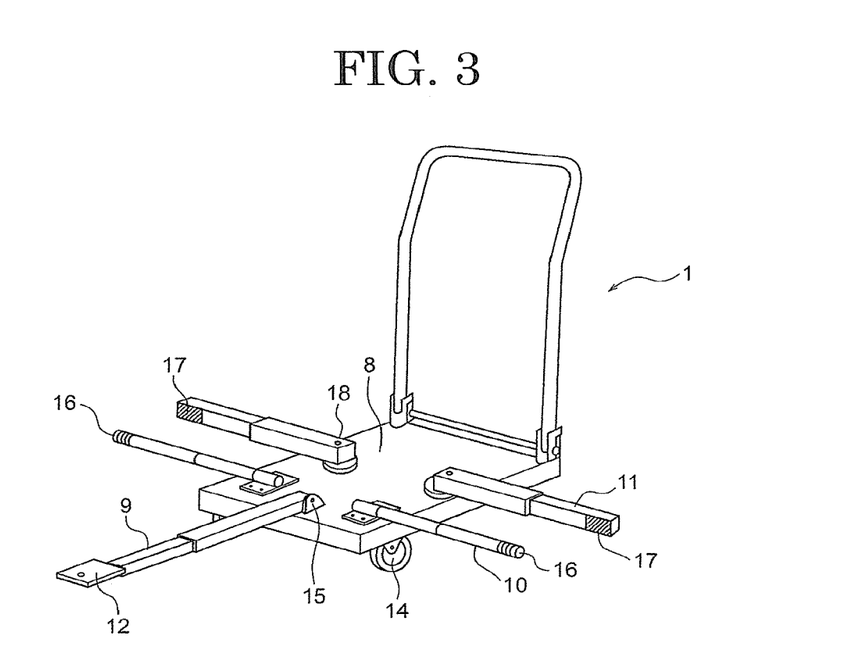
FIG. 3 is an overall oblique projection that shows the elevator hoistway dimension measuring apparatus from FIG. 2 except for a three dimensional coordinate measuring machine.

FIG. 1 is a cross section that shows a hoistway 2 that is measured using an elevator hoistway dimension measuring apparatus 1 (hereinafter abbreviated to "measuring apparatus 1") according to Embodiment 1 of the present invention, FIG. 2 is an oblique projection that shows a state in which inner dimensions of the hoistway 2 are measured using the measuring apparatus 1, and FIG. 3 is an overall oblique projection that shows the measuring apparatus 1 except for a three dimensional coordinate measuring machine 13.

A car 4 that ascends and descends so as to be guided by guide rails 3 is disposed inside the hoistway 2. A doorframe 5, a landing doorsill 6, and landing doors 7 are disposed in a doorway of an elevator landing.

The measuring apparatus 1 includes: a wheeled base 8 that has superior portability, being a cart, for example; a first arm 9 that extends in a direction of travel of the wheeled base 8 that is mounted to an installation floor 19 from a central portion of a leading end portion in the direction of travel; a pair of second arms 10 that each extend in a direction perpendicular to the direction of travel from two sides in the direction of travel of the wheeled base 8; a pair of third arms 11 that extend parallel to the second arms 10 behind the second arms 10 in the above direction of travel; a pedestal 12 that is mounted to the leading end portion of the first arm 9; and a three dimensional coordinate measuring machine 13 that is fixed to this pedestal 12.

This three-dimensional coordinate measuring machine 13 is a non-contact measuring machine, and is a laser three-dimensional coordinate measuring machine that measures distance to an object from phase differences by shining a laser on the object, for example.

Moreover, buffering members 16 that are made of rubber, etc., are disposed on leading end portions of the second arms 10, and buffering members 17 are also disposed on sides of leading end portions of the third arms 11 that face the doorframe 5.

Moreover, if surfaces of a facing pair of jambs 25 of the doorframe 5, with which the buffering members 16 are placed in contact, are inclined surfaces, then rotor-shaped rubber members that absorb the inclines are used.

Furthermore, if elevator doorway width is special, such as in large elevators that are installed in factories, for example, then doorway widths that are set so as to be greater than in general passenger elevators can be accommodated by replacing the second arms 10 with long types.

Although not shown, the wheels 14 of the wheeled base 8 include stoppers or brakes. in the claims The first arm 9 is mounted pivotably to the wheeled base 7 by a spindle 15. This first arm 9 is constituted by an inner tube, and an outer tube that is slidable relative to the inner tube, so as to be extensible and retractable, and also has a function that enables the inner tube and the outer tube to be fixed at any position.

The horizontal position of the three-dimensional coordinate measuring machine 13 is adjusted by adjusting the angle of elevation or depression of this first arm 9 around the spindle 15.

A base end portion of each of the second arms 10 is mounted to the wheeled base 8. These second arms 10 have a similar or identical configuration to the first arm 9, and have an extending and retracting function and a fixing function.

These second arms 10 each expand and contract, and positioning of the three-dimensional coordinate measuring machine 13 to the left and right relative to the doorway from the installation floor 19 of the elevator on which the measuring apparatus 1 is installed is achieved by the leading end surfaces being placed in contact with inner surfaces of the jambs 25 of the doorframe 5.

Each of the third arms 11 is mounted to the wheeled base 8 by a spindle 18 so as to be pivotable horizontally. These third arms 11 have a similar or identical configuration to the second arms 10, and have an extending and retracting function and a fixing function. These third arms 11 prevent the measuring apparatus 1 from falling into the hoistway 2.

In other words, the pair of third arms 11 are larger than a width of the doorframe 5 in the state in which both are extended to the left and right, and have a certain amount of overlap with the doorframe 5.

Moreover, the first arm 9, the second arms 10, and the third arms 11 may use an extension and retraction method other that by tubes such as the inner tube and the outer tube, and the first member and the second member may alternatively be connected by means of a slider, and also have a fixing function, for example.

Next, a procedure for installing the three-dimensional coordinate measuring machine 13 of the above measuring apparatus 1 inside the hoistway 2 will be explained.

First, as preparation before commencing measurement, the elevator is switched from a normal operating state to a state in which workers are able to raise and lower the car 4 from inside the car 4, and the car 4 is removed above or below the installation floor 19 on which the measuring apparatus 1 is to be installed so as to be outside the measurement range.

Next, the first arm 9 is pivoted around the spindle 15 so as to become horizontal, and then the three-dimensional coordinate measuring machine 13 is fixed to the pedestal 12.

Next, the pair of third arms 11 are respectively extended to the left and right, and then the wheeled base 8 is advanced toward the doorframe 5 until the buffering members 17 of the third arms 11 come into contact with the doorframe 5.

Next, the respective second arms 10 on the left and right are extended or retracted so as to be adjusted in length such that the three-dimensional coordinate measuring machine 13 is positioned so as to be able to perform measurement without being obstructed by obstacles such as cables, etc., and the respective buffering members 16 of the pair of second arms 10 are placed in contact with inner surfaces of the jambs 25 of the doorframe 5, and then the inner tubes and the outer tubes of the second arms 10 are fixed.

Lastly, the two landing doors 7 are closed so as to be placed in close proximity to a vicinity of the first arm 9.

The three-dimensional coordinate measuring machine 13 that is installed horizontally at a desired position in the hoistway 2 in this manner is activated by remote control, and the dimensions of the hoistway 2 are measured. After completion of the measurements, the landing doors 7 are opened, and the wheeled base 8 is reversed to convey the three-dimensional coordinate measuring machine 13 out of the hoistway 2.

Figure 4:
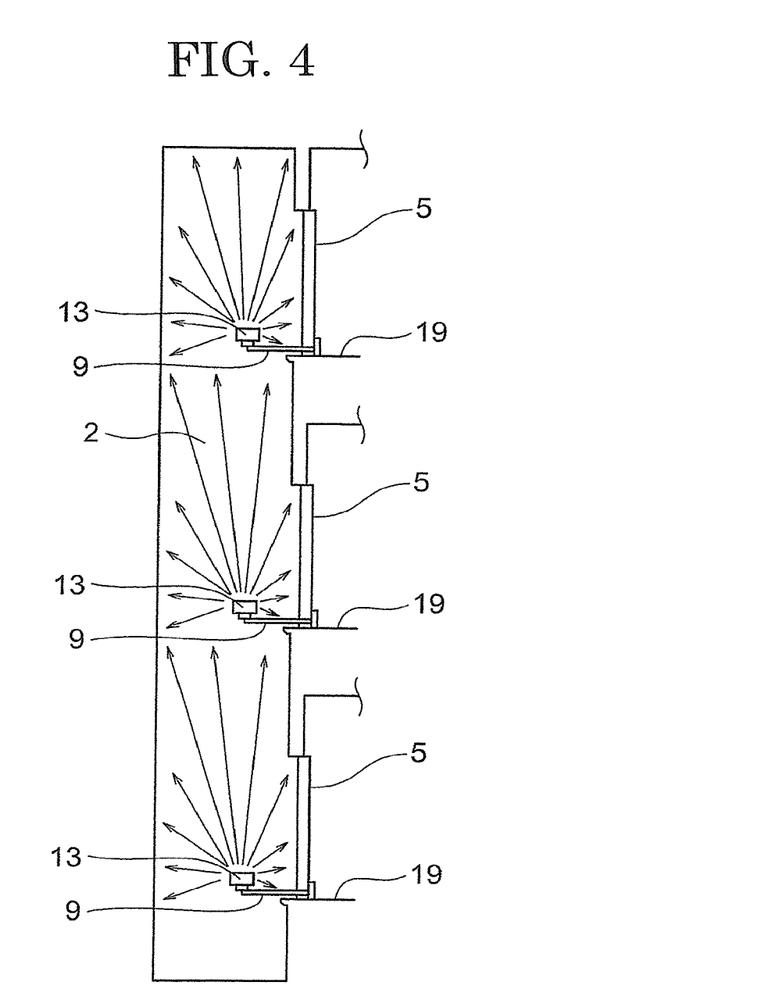
FIG. 4 is an overall view that shows measurements on respective floors that are required in order to measure all regions of an elevator hoistway using the elevator hoistway dimension measuring apparatus in FIG. 1.

Dimensional measurement of the hoistway 2 on a given installation floor 19 is completed in this manner, but three-dimensional data relating to the dimensions of the hoistway 2 for each of the installation floors 19 is acquired by repeating the above installation of the three-dimensional coordinate measuring machine 13 and dimensional measurement of the hoistway 2 on each of the installation floors 19, as shown in FIG. 4.

As has been explained above, according to the measuring apparatus 1 of this embodiment, because a three-dimensional coordinate measuring machine 13 that measures a hoistway 2 three-dimensionally is mounted by means of a pedestal 12 to a leading end portion of a first arm 9 that is inserted into a hoistway 2 from a wheeled base 8 that is installed on an installation floor 19, the three-dimensional coordinate measuring machine 13 can be installed inside the hoistway 2 simply without workers entering the hoistway 2 during installation inside the hoistway 2, shortening measuring time significantly, and also improving safety.

The base is a wheeled base 8, enabling the measuring apparatus 1 to be conveyed simply.

Because the first arm 9, the second arms 10, and the third arms 11 are all extensible and retractable, and also have a fixing function, the three-dimensional coordinate measuring machine 13 can be simply installed in a desired position that avoids positions where measurement might be hindered by cables, etc.

Because buffering members 16 and 17 are disposed on respective leading end portions of the second arms 10 and the third arms 11, the occurrence of damage to or scratching of the doorframe 5 due to collision with the second arms 10 and the third arms 11 when installing the three-dimensional coordinate measuring machine 13 inside the hoistway 2 can be prevented.

Because the base end portion of the first arm 9 is mounted to the wheeled base 8 so as to enable elevation or depression, the three-dimensional coordinate measuring machine 13 can be adjusted so as to be horizontal inside the hoistway 2.

Because base end portions of the third arms 11 are mounted onto the wheeled base 8 so as to be pivotable horizontally, the wheeled base 8 is positioned stably against the doorframe 5 by the third arms 11 coming into contact with surfaces on a landing side of the jambs 25 of the doorframe 5.

Moreover, in the above measuring apparatus 1, the base may be wheel less.

Furthermore, at least one arm among the first arm, the second arms, and the third arms may be extensible and retractable, and any of the first arm, the second arms, and the third arms may have a fixed length.

Respective base end portions of the first arm and the third arms may be fixed to the base.

Next, a method for obtaining dimensions of all regions of the hoistway 2 based on the dimension data for each of the installation floors 19 that is obtained using the measuring apparatus 1 that has the above configuration will be explained.

Figure 5:
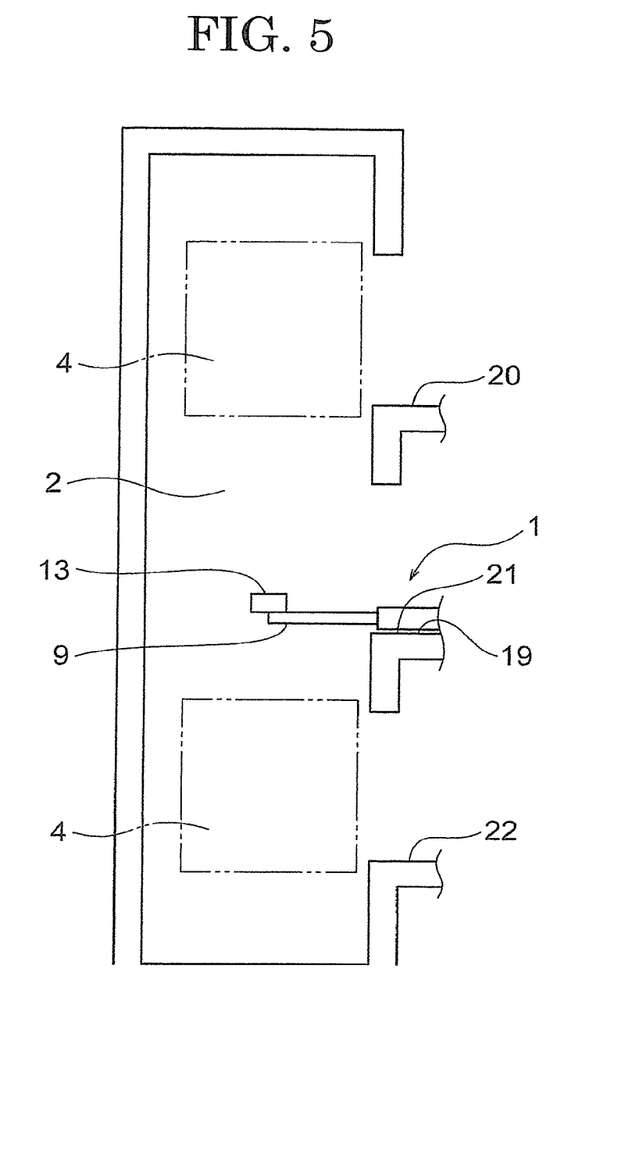
FIG. 5 is an explanatory diagram that shows when elevator hoistway measurement is performed using the elevator hoistway dimension measuring apparatus in FIG. 1.

First, as shown in FIG. 5, for example, if the car 4 is at the installation floor 19 (intermediate level floor 21) on which the measuring apparatus 1 is to be installed, the car 4 is removed to an upper level floor 20, and the dimensions of the hoistway 2 are measured using the three-dimensional coordinate measuring machine 13 at an intermediate level floor 21 and a lower level floor 22. In that case, there is a risk that lower level floor data that is obtained at the respective floors 21 and 22 may acquire data from bottom surfaces of the car 4, but in that situation, data for only the dimensions of the hoistway 2 is constructed by erasing portions that are not required using a computer.

Next, the car 4 is removed to a lower level floor 22, and the dimensions of the hoistway 2 are measured using the three-dimensional coordinate measuring machine 13 at the intermediate level floor 21 and an upper level floor 20. In that case, there is a risk that upper level floor data that is obtained at the respective floors 21 and 22 may acquire data from upper surfaces of the car 4d, but in that situation, data for only the dimensions of the hoistway 2 is constructed by erasing portions that are not required using a computer.

There is a risk that disparities in the dimension data may arise between the lower level floor data and the upper level floor data that is obtained in this manner, but in answer to that, disparities in the dimensional data are corrected by respectively measuring a shared portion of the hoistway 2 and integrating the lower level floor data and the upper level floor data based on the dimension data for that shared portion.

Figure 6:
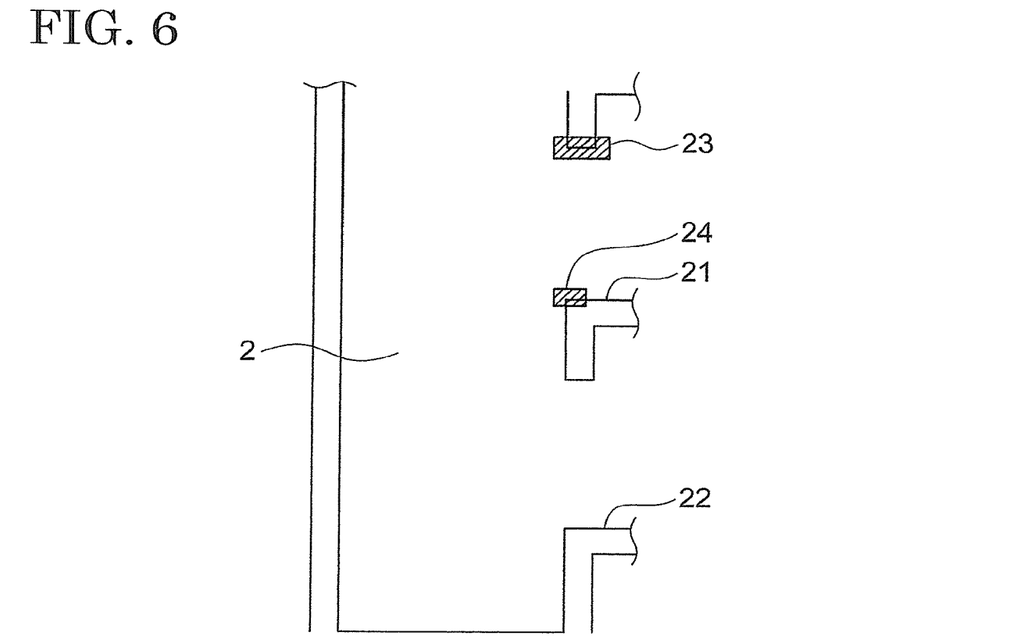
FIG. 6 is an explanatory diagram that shows shared portions of lower level floor data using the elevator hoistway dimension measuring apparatus in FIG. 1.

In this embodiment, the lower level floor data that is obtained when the car 13 is on the upper level floor 20 includes data for the landing doorsill upper surface 23 and the doorframe lintel lower surface 24 of the intermediate level floor 21 that is shown in FIG. 6.

Figure 7:
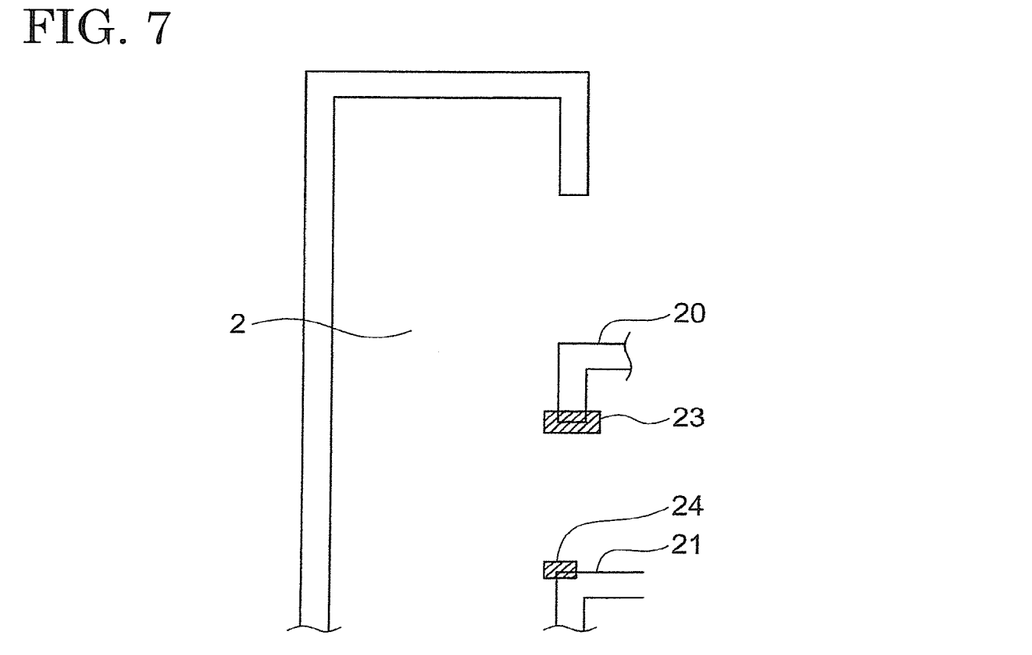
FIG. 7 is an explanatory diagram that shows shared portions of upper level floor data using the elevator hoistway dimension measuring apparatus in FIG. 1.

The upper level floor data that is obtained when the car 13 is on the lower level floor 22 includes data for the landing doorsill upper surface 23 and the doorframe lintel lower surface 24 of the intermediate level floor 21 that is shown in FIG. 7.

Thus, the lower level floor data and the upper level floor data have shared data in relation to the landing doorsill upper surface 23 and the doorframe lintel lower surface 24 of the intermediate level floor 21, which are shared portions.

Consequently, the dimensions of all regions of the hoistway 2 can be found by holding the three-dimensional coordinate measuring machine 13 at a predetermined position at each of the installation floors 19, and integrating the lower level floor data and the upper level floor data that is obtained by the three-dimensional coordinate measuring machine 13 based on the shared data for the lower level floor data and the upper level floor data.

Moreover, the above embodiment has been explained using an example in which there were three levels of floors, but even if there are four or more levels of floors, the car can be removed to an uppermost floor such that lower level floor data for floors that are lower than the uppermost floor can be obtained, and then the car removed to a lowermost floor such that upper level floor data for floors that are above the lowermost floor can be obtained, and then the lower level floor data and the upper level floor data can be integrated based on the shared data for the lower level floor data and the upper level floor data to find the dimensions of all regions of the hoistway 2 from that data.

Embodiment 2

Figure 8:
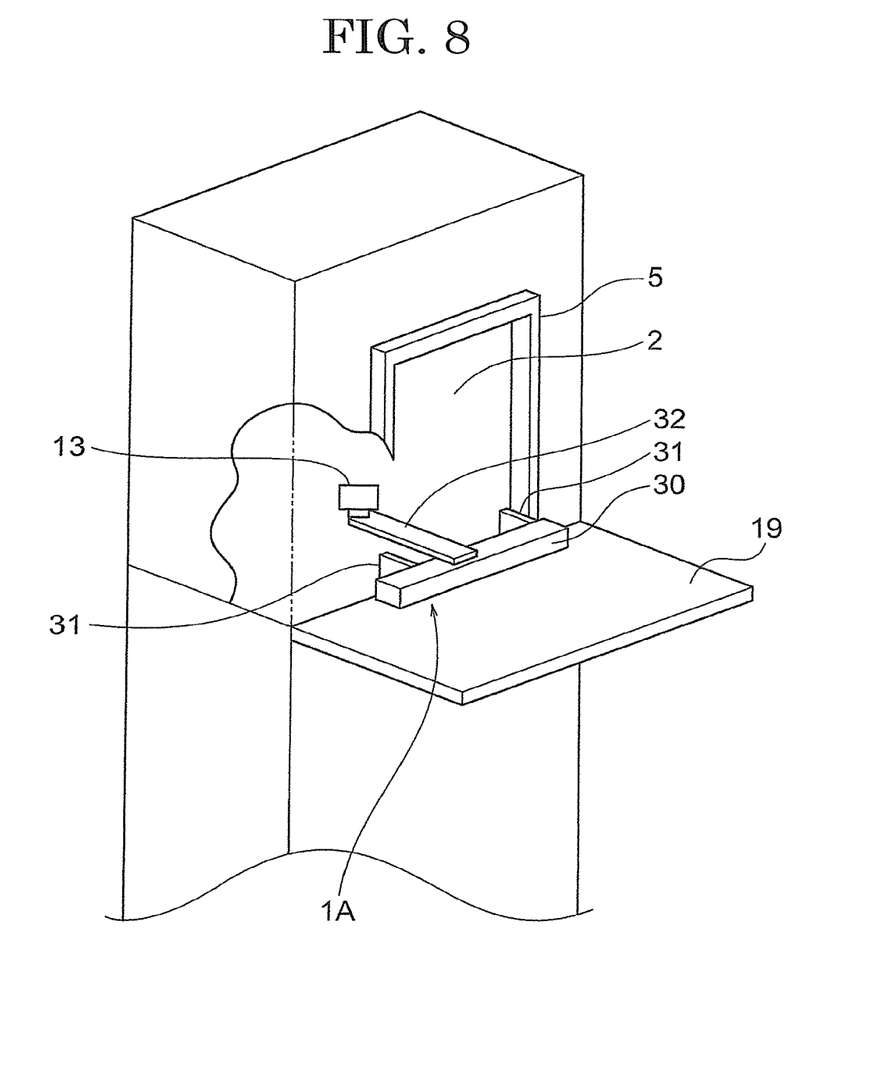
FIG. 8 is an oblique projection that shows a state in which dimensions of a hoistway are measured using an elevator hoistway dimension measuring apparatus according to Embodiment 2 of the present invention.

FIG. 8 is an oblique projection that shows a measuring apparatus 1A according to Embodiment 2 of the present invention.

A measuring apparatus 1A according to Embodiment 2 includes: an arm 30 that is wider than the doorframe 5 and that extends to the left and right along an installation floor 19; a pair of contacting members 31 that are disposed on two ends of this arm 30 and that can be moved to the left and right and fixed; a penetrating member 32 that extends perpendicularly from a central portion between the contacting members 31 so as to penetrate into the hoistway 2; and a three-dimensional coordinate measuring machine 13 that is mounted to a leading end portion of this penetrating member 32.

The arm 30 corresponds to the third arms 11 in Embodiment 1, and prevents the measuring apparatus 1A from falling into the hoistway 2.

The contacting members 31 correspond to the second arms 10 in Embodiment 1, and the position of the three-dimensional coordinate measuring machine 13 in a lateral direction relative to the doorframe 5 when viewed from the installation floor 19 is set by moving and fixing each of them.

The rest of the configuration is similar or identical to the measuring apparatus 1 according to Embodiment 1.

In the measuring apparatus 1A according to this embodiment, the dimensions of the hoistway 2 can be measured by following a procedure that is similar to that of Embodiment 1, and similar or identical effects to those of the measuring apparatus 1 according to Embodiment 1 can be achieved except that there is no portability without the wheeled base 8 according to Embodiment 1.

Moreover, the contacting members 31 may be fixed on the arm 30 so as to be dedicated to the elevator hoistway 2 that is being measured.

Furthermore, at least one of either the arm 30 or the penetrating member 32 may be extensible and retractable and have a fixing function.

Moreover, in each of the above embodiments, the three-dimensional coordinate measuring machine 13 was a laser three-dimensional coordinate measuring machine device, but may be an ultrasonic three-dimensional coordinate measuring machine that measures distance by transmitting and receiving ultrasonic waves.

The present invention can be applied to both hydraulic elevators and rope elevators.

With regard to the integration of the data, if there is shared data other than the landing doorsill 6 and the doorframe 5, such as structures (wall surfaces, steel framework, etc.) of the hoistway 2 or component equipment of the elevator, then these can also be used as references.

EXPLANATION OF NUMBERING 1, 1A ELEVATOR HOISTWAY DIMENSION MEASURING APPARATUS; 2 HOISTWAY; 3 GUIDE RAILS; 4 CAR; 5 DOORFRAME; 6 LANDING DOORSILL; 7 LANDING DOOR; 8 WHEELED BASE; 9 FIRST ARM; 10 SECOND ARM; 11 THIRD ARM; 12 PEDESTAL; 13 THREE-DIMENSIONAL COORDINATE MEASURING MACHINE; 14 WHEEL; 15, 18 SPINDLE; 16, 17 BUFFERING MEMBER; 19 INSTALLATION FLOOR; 20 UPPER LEVEL FLOOR; 21 INTERMEDIATE LEVEL FLOOR; 22 LOWER LEVEL FLOOR; 23 LANDING DOORSILL UPPER SURFACE; 24 DOORFRAME LINTEL LOWER SURFACE; 25 JAMB; 30 ARM; 31 CONTACTING MEMBER; 32 PENETRATING MEMBER.

The invention claimed is:

1. An elevator hoistway dimension measuring apparatus comprising:
a base that is positioned on a floor of a building,
a first arm that has a first end connected to the base and has a second end that projects inside a hoistway; and
a three-dimensional coordinate measuring machine that is mounted to said first arm inside the hoistway to measure said hoistway three-dimensionally from inside said hoistway.

2. The elevator hoistway dimension measuring apparatus according to claim 1, further comprising third arms that have a certain amount of overlap with a doorframe as viewed from a position outside the hoistway in a direction from one end of the base to the doorframe.

3. The elevator hoistway dimension measuring apparatus according to claim 2, further comprising:
a pair of second arms that extend from two sides of said base when viewed in a direction that said first arm extends from said base so as to penetrate inside said hoistway, and that are respectively placed in contact with inner surfaces of a pair of jambs of said doorframe,
wherein the third arms are mounted to the base.

4. The elevator hoistway dimension measuring apparatus according to claim 3, wherein:
said base is movable; and
at least one of said first arm, said second arms, and said third arms is extensible and retractable.

5. The elevator hoistway dimension measuring apparatus according to claim 4, wherein said base is wheeled.

6. The elevator hoistway dimension measuring apparatus according to claim 3, wherein buffering members are disposed on respective leading end portions of said second arms and said third arms.

7. The elevator hoistway dimension measuring apparatus according to claim 3, wherein:
   said first arm is mounted to said base such that a base end portion can be elevated or depressed; and
   each of said third arms is mounted to said base such that a base end portion is pivotable horizontally.

8. The elevator hoistway dimension measuring apparatus according to claim 2, further comprising a pair of contacting members that are respectively disposed on two ends of said third arms so as to come into contact with inner surfaces of said doorframe.

9. The elevator hoistway dimension measuring apparatus according to claim 8, wherein said contacting members are movable along said third arms.

10. The elevator hoistway dimension measuring apparatus according to claim 8, wherein at least one of said first arm and said third arms is extensible and retractable.

11. The elevator hoistway dimension measuring apparatus according to claim 1, wherein said three-dimensional coordinate measuring machine is a laser three-dimensional coordinate measuring machine.

12. A measuring method for an elevator hoistway dimension measuring apparatus that uses the elevator hoistway dimension measuring apparatus according to claim 1 to measure dimensions of said hoistway, said measuring method comprising:
   removing a car that ascends and descends through said hoistway further upward or downward than an installation floor on which said elevator hoistway dimension measuring apparatus is installed;
   subsequently obtaining lower level floor data for floors that are lower than an upper level floor that is above said installation floor using said three-dimensional coordinate measuring machine when said car is at said upper level floor;
   obtaining upper level floor data for floors that are higher than a lower level floor that is below said installation floor using said three-dimensional coordinate measuring machine when said car is at said lower level floor; and
   subsequently integrating said lower level floor data and said upper level floor data based on data for shared portions of said hoistway in said lower level floor data and said upper level floor data to obtain dimensions of all regions of said hoistway from said integrated data.

13. The measuring method for an elevator hoistway dimension measuring apparatus according to claim 12, wherein said shared portions are a landing doorsill upper surface and a doorframe lintel lower surface.

* * * * *